US010761615B2

(12) United States Patent
Ano

(10) Patent No.: US 10,761,615 B2

(45) Date of Patent: Sep. 1, 2020

(54) ELECTRONIC APPARATUS, DISPLAY SYSTEM, AND METHOD FOR CONTROLLING ELECTRONIC APPARATUS

(71) Applicant: SEIKO EPSON CORPORATION, Tokyo (JP)

(72) Inventor: Takahiro Ano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 61 days.

(21) Appl. No.: 16/143,521

(22) Filed: Sep. 27, 2018

(65) Prior Publication Data

US 2019/0094988 A1 Mar. 28, 2019

(30) Foreign Application Priority Data

Sep. 28, 2017 (JP) ................................ 2017-187587

(51) Int. Cl.

| | |
|---|---|
| ***G09G 3/20*** | (2006.01) |
| ***G06F 3/03*** | (2006.01) |
| ***G06F 3/01*** | (2006.01) |
| ***G06T 11/60*** | (2006.01) |
| ***G09G 3/00*** | (2006.01) |
| ***G03B 21/56*** | (2006.01) |
| ***H04N 21/422*** | (2011.01) |
| ***G03B 21/10*** | (2006.01) |
| *G06F 3/033* | (2013.01) |

(52) U.S. Cl.

CPC ........... *G06F 3/0304* (2013.01); *G03B 21/10* (2013.01); *G03B 21/56* (2013.01); *G06F 3/017* (2013.01); *G06T 11/60* (2013.01); *G09G 3/002* (2013.01); *H04N 21/42221* (2013.01); *G06F 3/011* (2013.01); *G06F 3/033* (2013.01); *G06T 2200/24* (2013.01); *G09G 3/2096* (2013.01)

(58) Field of Classification Search

CPC ....... G06F 3/0304; G06F 3/017; G03B 21/10; G03B 21/56; G06T 11/60; G09G 3/002; G09G 3/2096; H04N 21/42221

See application file for complete search history.

(56) References Cited

U.S. PATENT DOCUMENTS

| | | | |
|---|---|---|---|
| 7,224,323 | B2 | 5/2007 | Uchida et al. |
| 9,122,378 | B2 | 9/2015 | Natori et al. |
| 2005/0188401 | A1 | 8/2005 | Uchida et al. |
| 2013/0298029 | A1 | 11/2013 | Natori et al. |

FOREIGN PATENT DOCUMENTS

| | | | |
|---|---|---|---|
| JP | 2002-034023 | A | 1/2002 |
| JP | 2013-080141 | A | 5/2013 |
| JP | 2013-117783 | A | 6/2013 |
| JP | 2013-235318 | A | 11/2013 |

*Primary Examiner* — Michael Pervan

(74) *Attorney, Agent, or Firm* — Oliff PLC

(57) ABSTRACT

An electronic apparatus includes: first to third source-side IF units; and a control unit which causes one of the first to third source-side IF units to transmit image data inputted thereto, to a projector, when an operation mode of the electronic apparatus is a first operation mode, and which causes one of the first to third source-side IF units that is not the one of the first to third source-side IF units connected when in the first operation mode, to transmit image data inputted thereto, to the projector, when the operation mode of the electronic apparatus is a second operation mode. The control unit switches the operation mode to one of the first operation mode and the second operation mode in response to a change request received from the projector.

8 Claims, 10 Drawing Sheets

265

INPUT SOURCE MANAGEMENT TABLE

| IDENTIFICATION INFORMATION | PORT NUMBER | INTERFACE STANDARD | IMAGE ADJUSTMENT VALUE |
|---|---|---|---|
| FIRST INPUT IF UNIT | XXX | D-sub | TONE OF COLOR: AAA<br>DEPTH OF COLOR: BBB<br>CONTRAST: CCC<br>⋮ |
| SECOND INPUT IF UNIT | YYY | HDMI | BRIGHTNESS: XXX<br>REFRESH RATE: YYY<br>COLOR: ZZZ<br>⋮ |
| THIRD INPUT IF UNIT | ZZZ | HDMI | BRIGHTNESS: XXX<br>REFRESH RATE: YYY<br>COLOR: ZZZ<br>⋮ |
| FOURTH INPUT IF UNIT | VVV | ETHERNET | TONE OF COLOR: AAA<br>DEPTH OF COLOR: BBB<br>CONTRAST: CCC<br>⋮ |
| ⋮ | ⋮ | ⋮ | ⋮ |

INPUT SOURCE MANAGEMENT TABLE

| IDENTIFICATION INFORMATION | PORT NUMBER | INTERFACE STANDARD | IMAGE ADJUSTMENT VALUE |
|---|---|---|---|
| FIRST INPUT IF UNIT | XXX | D-sub | BRIGHTNESS: XXX<br>REFRESH RATE: YYY<br>COLOR: ZZZ<br>⋮ |
| SECOND INPUT IF UNIT | YYY | HDMI | BRIGHTNESS: XXX<br>REFRESH RATE: YYY<br>COLOR: ZZZ<br>⋮ |
| FIRST SOURCE-SIDE IF UNIT | XYZ | HDMI | BRIGHTNESS: XXX<br>REFRESH RATE: YYY<br>COLOR: ZZZ<br>⋮ |
| SECOND SOURCE-SIDE IF UNIT | STU | HDMI | BRIGHTNESS: XXX<br>REFRESH RATE: YYY<br>COLOR: ZZZ<br>⋮ |
| THIRD SOURCE-SIDE IF UNIT | FFF | HDMI | BRIGHTNESS: XXX<br>REFRESH RATE: YYY<br>COLOR: ZZZ<br>⋮ |
| FOURTH INPUT IF UNIT | VVV | ETHERNET | TONE OF COLOR: AAA<br>DEPTH OF COLOR: BBB<br>CONTRAST: CCC<br>⋮ |
| ⋮ | ⋮ | ⋮ | ⋮ |

ELECTRONIC APPARATUS, DISPLAY SYSTEM, AND METHOD FOR CONTROLLING ELECTRONIC APPARATUS

CROSS-REFERENCE

The entire disclosure of Japanese Patent Application No. 2017-187587, filed Sep. 28, 2017 is expressly incorporated by reference herein.

BACKGROUND

1. Technical Field

The present invention relates to an electronic apparatus, a display system, and a method for controlling an electronic apparatus.

2. Related Art

According to the related art, an electronic apparatus having a plurality of input interfaces and connected to a display device is known (see, for example, JP-A-2013-235318). Source apparatuses which supply image data to the display device are connected to the plurality of input interfaces. The electronic apparatus switches the input interface to be connected to the display device in response to an operation and thus switches the source apparatus to supply image data to the display device.

JP-A-2013-235318 discloses an operation panel which is connected to a projector via a dedicated cable and operates the projector. When an operation button provided on the operation panel is operated, the projector converts an image currently projected and displayed on a screen into print data printable by a printer and transmits the converted print data to the printer via the operation panel.

However, with the display device connected to a plurality of source apparatuses via the electronic apparatus, the source apparatus to supply image data to the display device cannot be switched by operating the display device.

SUMMARY

An advantage of some aspects of the invention is that an electronic apparatus connected to a display device can be operated by the display device.

An aspect of the invention is directed to an electronic apparatus including: a first interface; a second interface which is different from the first interface; a third interface connected to a display device; and a first control unit which causes the third interface to transmit image data inputted to the first interface to the display device when an operation mode of the electronic apparatus is a first operation mode, and causes the third interface to transmit image data inputted to the second interface to the display device when the operation mode of the electronic apparatus is a second operation mode. The first control unit switches the operation mode to one of the first operation mode and the second operation mode in response to a change request received from the display device.

This configuration allows the operation mode of the electronic apparatus to be switched to one of the first operation mode and the second operation mode in response to the change request received from the display device. Thus, the switching between the interfaces provided in the electronic apparatus can be carried out via the display device.

In the aspect of the invention, the first control unit may cause the third interface to receive the change request transmitted from the display device.

This configuration enables the third interface, which is used to transmit image data, to receive the change request for the operation mode.

In the aspect of the invention, the electronic apparatus may further include a fourth interface which is connected to the display device and is different from the third interface. The first control unit may cause the third interface to transmit image data inputted to the first interface to the display device when the operation mode of the electronic apparatus is the first operation mode, and may cause the third interface to transmit image data inputted to the second interface to the display device when the operation mode of the electronic apparatus is the second operation mode. The first control unit may switch the operation mode to one of the first operation mode and the second operation mode in response to the change request received by the fourth interface.

This configuration enables the fourth interface, which is different from the third interface transmitting image data, to receive the change request for the operation mode.

Another aspect of the invention is directed to a display system including a display device and an electronic apparatus connected to the display device. The electronic apparatus includes: a first interface; a second interface which is different from the first interface; a third interface connected to the display device; and a first control unit which causes the third interface to transmit image data inputted to the first interface to the display device when an operation mode of the electronic apparatus is a first operation mode, and causes the third interface to transmit image data inputted to the second interface to the display device when the operation mode of the electronic apparatus is a second operation mode. The first control unit switches the operation mode to one of the first operation mode and the second operation mode in response to a change request received from the display device.

This configuration allows the operation mode of the electronic apparatus to be switched to one of the first operation mode and the second operation mode in response to the change request received from the display device. Thus, the switching between the interfaces provided in the electronic apparatus can be carried out via the display device.

In the aspect of the invention, the first control unit may transmit information of the first interface and information of the second interface to the display device when the display device is connected to the electronic apparatus. The display device may include: a storage unit which stores a table where information of a connection interface with an external device provided in the display device is registered; a second control unit which registers, in the table, the information of the first interface and the information of the second interface received from the electronic apparatus; and an operation unit which accepts an operation. When an operation accepted by the operation unit selects the first interface or the second interface as the connection interface with the external device, the second control unit may transmit a change request to change to the first interface or the second interface thus selected, to the electronic apparatus.

This configuration enables the connection interface with the external device to be switched to the first interface or the second interface of the electronic apparatus by operating the display device. Thus, the switching between the interfaces provided in the electronic apparatus can be carried out via the display device.

In the aspect of the invention, the second control unit may delete, from the table, information of the connection interface of the display device to which the electronic apparatus is connected, and may register the information of the first interface and the information of the second interface in the table.

This configuration enables the information of the first interface and the information of the second interface to be registered as the information of the connection interface of the display device.

In the aspect of the invention, the second control unit may register, in the table, a set value that is set for image data inputted via the connection interface, as the information of the connection interface. When the second control unit registers the information of the first interface or the second interface, when information of a connection interface of the same standard as the first interface or the second interface is already registered in the table, the second control unit may register the set value that is set for the connection interface of the same standard, as the set value for the image data inputted via the first interface or the second interface.

This configuration can reduce the time and effort of resetting the set value that is set for image data, when registering the information of the first interface or the second interface in the table.

In the aspect of the invention, the display device may include a display unit. The second control unit may cause the display unit to display a display screen showing the information of the connection interface provided in the display device and the information of the first interface and the second interface. When the operation unit accepts an operation of selecting the first interface or the second interface, the second control unit may transmit a change request to request a change to the first interface or the second interface thus selected, to the electronic apparatus.

This configuration makes it possible to select an interface to which image data is inputted, with reference to the display screen displayed by the display device. Also, when the first interface or the second interface is selected as the interface to which image data is inputted, the switching between the interfaces provided in the electronic apparatus can be carried out via the display device.

Still another aspect of the invention is directed to a display device to which an electronic apparatus is connected including: a storage unit which stores a table where information of a connection interface provided in the display device and information of a connection interface provided in the electronic apparatus are registered; an operation unit which accepts an operation; and a second control unit which, when an operation accepted by the operation unit selects the connection interface of the electronic apparatus, transmits a change request to change to the connection interface thus selected, to the electronic apparatus.

This configuration enables the switching between the interfaces provided in the electronic apparatus via the display device.

In the aspect of the invention, the second control unit may register, in the table, a set value that is set for image data inputted via the connection interface, as the information of the connection interface. When the second control unit registers the information of the connection interface of the electronic apparatus in the table, when the connection interface of the display device includes a connection interface of the same standard as the connection interface of the electronic apparatus, the second control unit may register the set value that is set for the connection interface of the display device the same standard, as the set value for the image data inputted via the connection interface of the electronic apparatus.

This configuration can reduce the time and effort of resetting the set value that is set for image data inputted, when registering the information of the first interface or the second interface in the table.

In the aspect of the invention, the display device may further include a display unit. The second control unit may cause the display unit to display a display screen showing the information of the connection interface of the display device and the information of the connection interface of the electronic apparatus. When the operation unit accepts an operation of selecting the connection interface of the electronic apparatus, the second control unit may transmit a change request to request a change to the connection interface thus selected, to the electronic apparatus.

This configuration makes it possible to select an interface to which image data is inputted, with reference to the display screen displayed by the display device. Also, when the first interface or the second interface is selected as the interface to which image data is inputted, the switching between the interfaces provided in the electronic apparatus can be carried out via the display device.

Still another aspect of the invention is directed to a method for controlling an electronic apparatus having a first interface, a second interface which is different from the first interface, and a third interface connected to a display device, the method including: switching an operation mode of the electronic apparatus to one of a first operation mode and a second operation mode in response to a change request received from the display device; causing the third interface to transmit image data inputted to the first interface to the display device when the operation mode of the electronic apparatus is the first operation mode; and causing the third interface to transmit image data inputted to the second interface to the display device when the operation mode of the electronic apparatus is the second operation mode.

This configuration allows the operation mode of the electronic apparatus to be switched to one of the first operation mode and the second operation mode in response to the change request received from the display device. Thus, the switching between the interfaces provided in the electronic apparatus can be carried out via the display device.

BRIEF DESCRIPTION OF THE DRAWINGS

The invention will be described with reference to the accompanying drawings, wherein like numbers reference like elements.

FIG. 4 shows a source management table before the switching device is connected.

FIG. 5 shows the source management table after the switching device is connected.

DESCRIPTION OF EXEMPLARY EMBODIMENTS

Hereinafter, an embodiment of the invention will be described with reference to the accompanying drawings.

Figure 1:
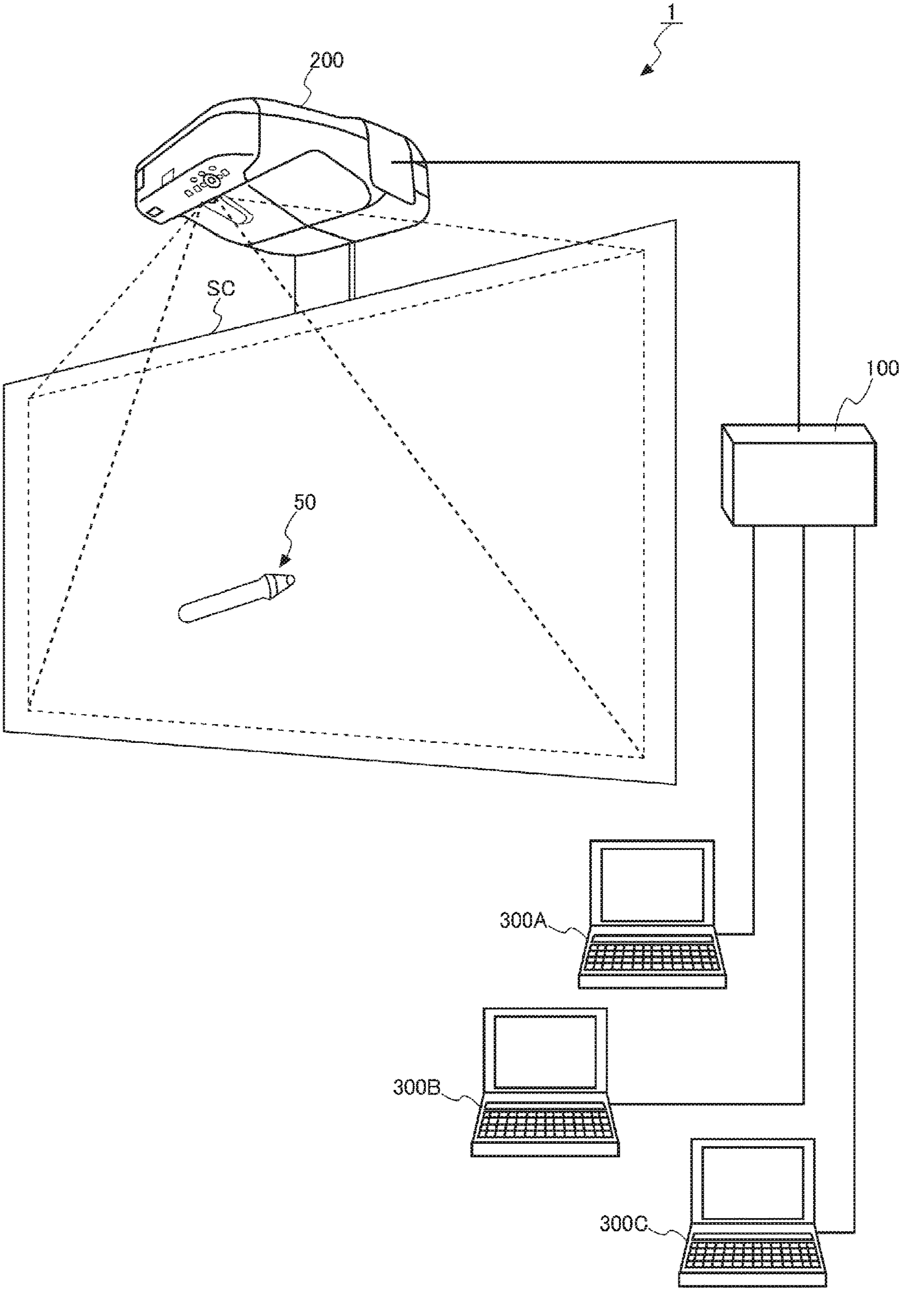
FIG. 1 shows an outline of a display system.

FIG. 1 shows an outline of a display system 1.

The display system 1 has a switching device 100 which operates as an electronic apparatus, a projector 200 which operates as a display device, and a plurality of image supply devices 300A to 300C. While FIG. 1 shows the display system 1 having three image supply devices 300, the number of image supply devices 300 is not limited to three. In the description below, the general term "image supply device 300" is used where the image supply devices 300A to 300C need not be particularly discriminated from each other.

The switching device 100 is a device which switches the connection of the projector 200 with one of the image supply devices 300A to 300C to another. Specifically, the switching device 100 is a device which outputs image data supplied from a selected image supply device 300 to the projector 200. The switching device 100 and each image supply device 300 may be connected via a cable or may be wirelessly connected. Similarly, the switching device 100 and the projector 200 may be connected via a cable or may be wirelessly connected. In this embodiment, the case where the switching device 100 and the image supply device 300 are connected via a cable and where the switching device 100 and the projector 200 are connected via a cable is described.

For the connection between the switching device 100 and the image supply device 300 and the connection between the switching device 100 and the projector 200, for example, the following interface can be used.

An interface capable of digitally transmitting a video signal and an audio signal such as HDMI (High-Definition Multimedia Interface, trademark registered), DisplayPort, MHL (Mobile High-Definition Link, trademark registered), HDBaseT (trademark registered), Thunderbolt (trademark registered), USB Type-C, or 3G-SDI (serial digital interface) can be used. Also, an interface for data communication such as Ethernet (trademark registered), IEEE 1394, or USB can be used. Moreover, the switching device 100, the projector 200, and the image supply device 300 may be provided with analog video terminals such as RCA terminal, VGA terminal, S terminal, and D terminal, and thus may transmit and receive analog video signals.

The projector 200 is installed above or obliquely above a screen SC as a display surface, and projects an image onto the screen SC. The screen SC is a flat board or curtain fixed to an interior wall of a room or standing upright on a floor surface. The display surface is not limited to the screen SC. For example, an interior wall surface of the room can be used as a screen. In this case, the projector 200 is installed at an upper part of the wall surface used as a screen.

The projector 200 is configured to be able to detect an operation on the screen SC. An operation on the screen SC uses a pointer 50 such as an electronic pen, user's finger, or pointing stick. The projector 200 picks up an image of the pointer 50 via an image pickup unit provided in the projector 200 and detects an operation on the screen SC carried out by the pointer 50.

The projector 200 has a drawing mode and a PC mode, as operation modes.

When in the drawing mode, the projector 200 detects the operation position of an operation on the screen SC and draws an image at the position on the screen SC corresponding to the detected operation position. Meanwhile, when its operation mode is the PC mode, the projector 200 outputs information representing the detected operation position on the screen SC to an external device such as a personal computer connected to the projector 200. The external device converts the information transmitted from the projector 200 into information of a mouse operation and processes the information.

The image supply device 300 is a device which supplies image data to the projector 200. The image supply device 300 may be, for example, a Blu-ray (trademark registered) or DVD (digital versatile disc) player (image playback device), a broadcast receiving device such as a digital television tuner, or an image output device such as a video game machine or personal computer. The image supply device 300 may also be a communication device or the like which wirelessly communicates with a personal computer and receives image data.

Figure 2:
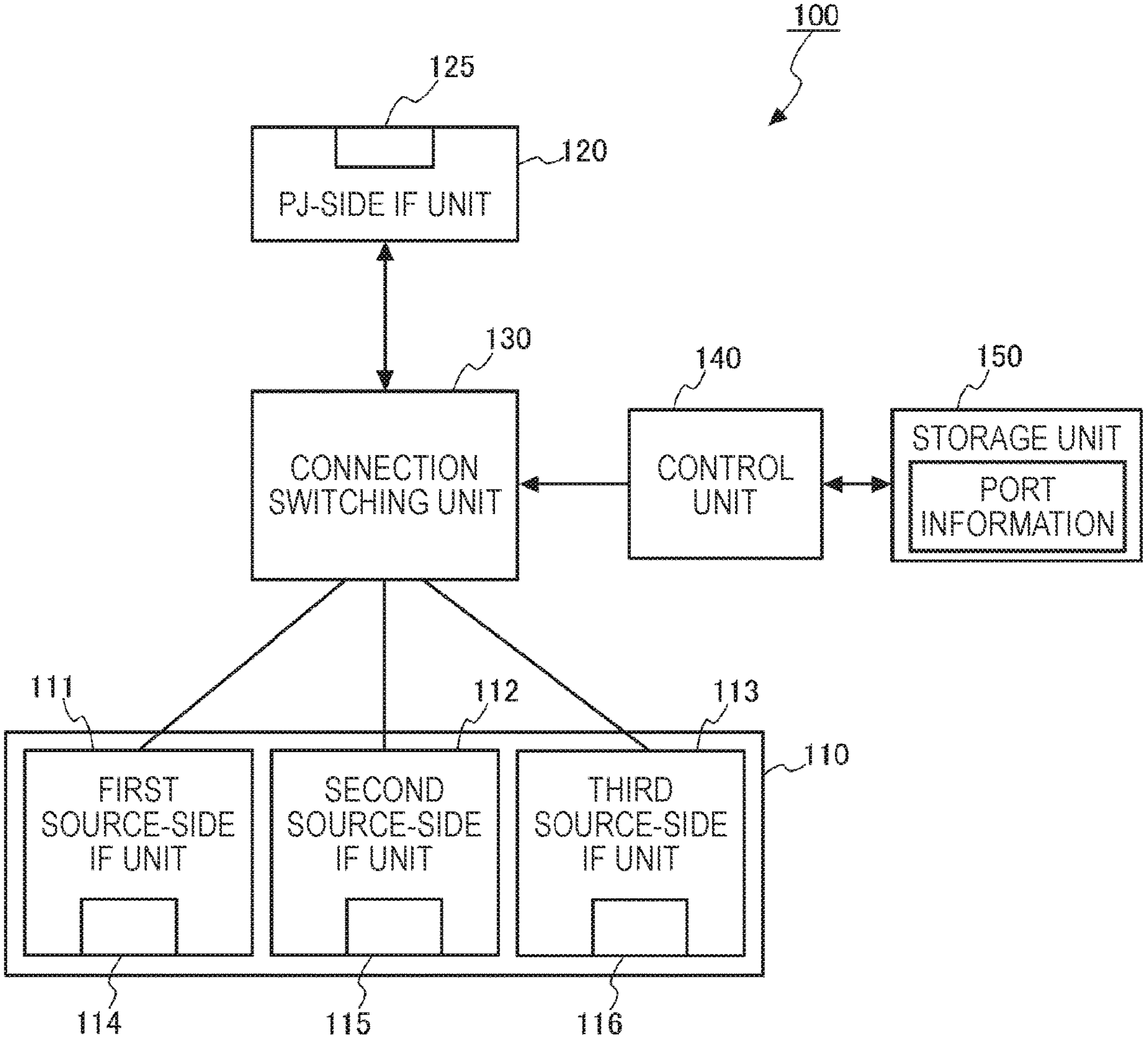
FIG. 2 shows a configuration of a switching device.

FIG. 2 shows a configuration of the switching device 100.

The switching device 100 has a source-side interface unit 110 (hereinafter the interface being also referred to as IF), a projector-side interface unit (hereinafter abbreviated as PJ-side IF unit) 120, a connection switching unit 130, a control unit 140, and a storage unit 150. The control unit 140 is equivalent to the "first control unit" according to the invention.

The source-side IF unit 110 is a connection interface which connects to the image supply device 300 as a source apparatus. The source-side IF unit 110 has three interface units, that is, a first source-side IF unit 111, a second source-side IF unit 112, and a third source-side IF unit 113. The first to third source-side IF units 111 to 113 are equivalent to one of the "first interface" and the "second interface" according to the invention. The first source-side IF unit 111 has a connection port 114, the second source-side IF unit 112 has a connection port 115, and the third source-side IF unit 113 has connection port 116, with connection cables to the image supply devices 300 being connected to these connection ports 114, 115, and 116. Each of the first source-side IF unit 111, the second source-side IF unit 112, and the third source-side IF unit 113 also has an interface circuit which processes signals (not illustrated). FIG. 2 shows the case where the source-side IF unit 110 has the three interface units, that is, the first source-side IF unit 111, the second source-side IF unit 112, and the third source-side IF unit 113. However, the source-side IF unit 110 may have any number of interface units.

The first source-side IF unit 111, the second source-side IF unit 112, and the third source-side IF unit 113 may be interface units of the same standard or interface units of different standards. In this embodiment, the case where the first source-side IF unit 111, the second source-side IF unit 112, and the third source-side IF unit 113 are interface units conforming to the HDMI standard is described.

The PJ-side IF unit 120 is a connection interface which connects to the projector 200. The PJ-side IF unit 120 is equivalent to the "third interface" according to the invention. The PJ-side IF unit 120 has a connection port 125 to which a connection table to the projector 200 is connected, and an interface circuit which processes signals (not illustrated). In this embodiment, the case where the PJ-side IF unit 120 is an interface unit conforming to the HDMI standard is described.

The connection switching unit 130 connects one of the first source-side IF unit 111, the second source-side IF unit 112, and the third source-side IF unit 113 to the PJ-side IF unit 120 under the control of the control unit 140.

The control unit 140 has, as hardware, a ROM (read only memory), RAM (random access memory), a CPU (central processing unit), and other peripheral circuits (none of which is illustrated), and controls each part of the switching device 100.

While FIG. 2 shows a configuration in which the functions of the control unit 140 are implemented by a single CPU (processor), the functions of the control unit 140 may be implemented by a plurality of processors or semiconductor chips. When executing processing by a plurality processors or semiconductor chips, the control unit 140 may cause the plurality of processors or semiconductor chips to collaborate or selectively use one of them and thus carry out various kinds of control.

The storage unit 150 is an internal storage and is made up of, for example, a non-volatile memory such as a flash memory. The storage unit 150 stores a control program executed by the control unit 140, and port information. The port information includes information of the number of connection ports provided in the source-side IF unit 110, information representing the signal input state to each connection port, information representing the port number of each connection port, information representing the interface standard of each connection port, and the like.

Figure 3:
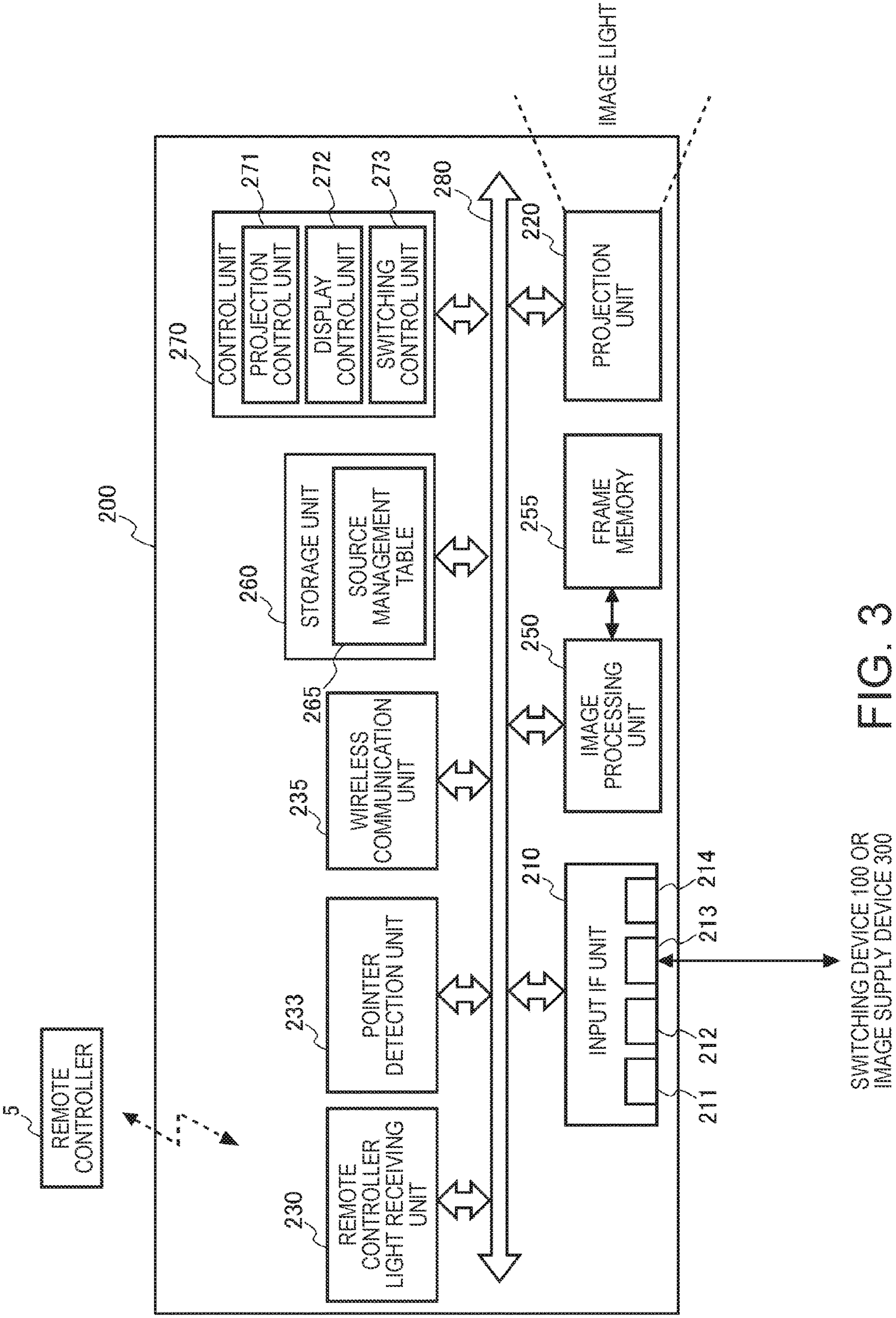
FIG. 3 shows a configuration of a projector.

FIG. 3 shows a configuration of the projector 200.

The projector 200 has, as functional units, an input IF unit 210, a projection unit 220, a remote controller light receiving unit 230, a pointer detection unit 233, a wireless communication unit 235, an image processing unit 250, a storage unit 260, and a control unit 270. These functions units are connected together via a bus 280. The projection unit 220 is equivalent to the "display unit" according to the invention. The control unit 270 is equivalent to the "second control unit" according to the invention.

The input IF unit 210 is a connection interface connected to the switching device 100 and the image supply device 300. The input IF unit 210 has four interface units, that is, a first input IF unit 211, a second input IF unit 212, a third input IF unit 213, and a fourth input IF unit 214. Each of the input IF units 211, 212, 213, and 214 has a connection port and an interface circuit which processes signals (none of which is illustrated). FIG. 3 shows the case where the input IF unit 210 has the four interface units, that is, the first input IF unit 211, the second input IF unit 212, the third input IF unit 213, and the fourth input IF unit 214. However, the input IF unit 210 may have any number of interface units.

In this embodiment, the case where the first input IF unit 211 to the fourth input IF unit 214 are the following interfaces is described as an example.

The first input IF unit 211 has a D-sub terminal as a connection port and has an interface circuit which processes a VGA signal.

The second input IF unit 212 and the third input IF unit 213 have an HDMI port as a connection port and have an interface circuit which processes an HDMI signal.

The fourth input IF unit 214 has an Ethernet port as a connection port and has an interface circuit which processes an Ethernet signal (differential signal).

The four input IF units 211 to 214 are simply an example and can be changed.

The projection unit 220 forms an optical image and projects the formed image onto the screen SC. The projection unit 220 has a light source, a light modulation unit which modulates light emitted from the light source and thus generates image light, a projection system which projects the image light generated by the light modulation unit onto the screen SC, and the like (none of which is illustrated).

The remote controller light receiving unit 230 receives an infrared signal transmitted from a remote controller 5. The remote controller 5 has various operation buttons and transmits an infrared signal corresponding to an accepted operation. The remote controller light receiving unit 230 decodes the received infrared signal, generates an operation signal representing the content of the operation on the remote controller 5, and outputs the operation signal to the control unit 270.

The pointer detection unit 233 detects an operation of the pointer 50 on the screen SC.

The pointer detection unit 233 has an image pickup unit which generates picked-up image data every predetermined image pickup period. The image pickup unit picks up an image of the entire screen SC or peripheries including the screen SC, via visible light or invisible light such as infrared light.

Various methods can be employed for the pointer detection unit 233 to detect the pointer 50. For example, it is now assumed that the pointer 50 has a light emitting unit, not illustrated, and that the light emitting unit emits light when the distal end of the pointer 50 touches the screen SC. In this case, the pointer detection unit 233 analyzes picked-up image data generated by the image pickup unit, thus detects a position of light emission of the light emitting unit, and outputs coordinate information representing the detected position of light emission on the picked-up image data to the control unit 270 as an operation position. The light emitted from the light emitting unit of the pointer 50 may be visible light or invisible light such as infrared light. If the light emitting unit of the pointer 50 emits invisible light, a visible light cut filter which only transmits infrared light may be provided before the image pickup unit.

The wireless communication unit 235 has an antenna, an RF (radio frequency) circuit, and the like, not illustrated. The wireless communication unit 235 executes wireless communication with an external device, under the control of the control unit 270. As the wireless communication method of the wireless communication unit 235, for example, a short-range wireless communication method such as wireless LAN (local area network), Bluetooth (trademark registered), UWB (ultra-wide band), or infrared communication, or a wireless communication method using a mobile phone network can be employed.

The image processing unit 250 has a frame memory 255 connected thereto. The image processing unit 250 loads image data inputted from the input IF unit 210 into the frame memory 255 and carries out image processing. As the frame memory 255, for example, a memory which data is read from or written into synchronously with a clock, such as SDRAM (synchronous dynamic random access memory), is used.

The processing carried out by the image processing unit 250 includes, for example, resolution conversion (scaling) or resizing, shape correction such as distortion correction, digital zooming, color tone correction, luminance correction, and the like. The image processing unit 250 executes processing designated by the control unit 270. The image processing unit 250 also carries out processing, using a parameter inputted from the control unit 270 according to need. The image processing unit 250 can also execute a combination of a plurality of kinds of processing from among the foregoing processing.

The image processing unit 250 loads drawing data generated by the control unit 270 into the frame memory 255, where image data is loaded. That is, the image processing unit 250 superimposes the drawing data on the image data. Thus, combined data of the image data and the drawing data is generated. The image processing unit 250 reads out the image data with which image processing is completed, or the combined data, and outputs the read-out data to the projection unit 220. The projection unit 220 causes the light modulation unit to generate image light based on the inputted image data or combined data. The projection unit 220 causes the projection system to project the generated image light on the screen SC.

The storage unit 260 is, for example, an auxiliary storage device such as a hard disk device. The storage unit 260 may be replaced by a DRAM (dynamic RAM), flash memory capable of storing a large volume of information, or an optical disc such as a CD (compact disc), DVD (digital versatile disc), or BD (Blu-ray (trademark registered) disc).

The storage unit 260 stores a control program executed by the control unit 270 and image data received by the input IF unit 210. The storage unit 260 also stores a source management table 265 generated by the control unit 270. Details of the source management table 265 will be described later with reference to FIG. 4.

The control unit 270 has, as hardware, a CPU, a ROM, a RAM, and other peripheral circuits (none of which is illustrated). The CPU is a processor which executes computational processing. The CPU executes computation processing according to the control program stored in the ROM or the storage unit 260. The ROM is a non-volatile memory and stores, for example, the control program and computational data. The RAM is used as a work area where the control program and computational data executed by the processor are temporarily stored.

In this embodiment, the control unit 270 has one processor (CPU), and this processor executes processing according to the control program, thus implementing the functions of the control unit 270. However, the functions of the control unit 270 may be implemented by a plurality of processors or semiconductor chips. For example, the control unit 270 may further include a sub-processing device (co-processor) such as a SoC (system on a chip), MCU (micro control unit), or FPGA (field-programmable gate array). The control unit 270 may cause both of the CPU and the sub-processing device to collaborate or selectively use one of them and thus carry out various kinds of control.

The control unit 270 has, as functional blocks, a projection control unit 271, a display control unit 272, and a switching control unit 273. These functional blocks represent some functions implemented by the CPU executing computational processing according to the control program as a matter of convenience and therefore do not represent any specific application or hardware.

The projection control unit 271 controls the image processing unit 250 and the projection unit 220 so as to project an image on the screen SC.

For example, the projection control unit 271 causes the image processing unit 250 to process image data received by the input IF unit 210. In this case, the projection control unit 271 may read out from the storage unit 260 a necessary parameter for the processing to be executed by the image processing unit 250, and send the parameter to the image processing unit 250. The projection control unit 271 also carries out lighting control and luminance adjustment for the light source of the projection unit 220, and controls the projection system to adjust zooming and focusing, or the like.

To the display control unit 272, coordinate information representing an operation position is inputted from the pointer detection unit 233. The coordinate information representing the operation position inputted to the display control unit 272 is information representing a position on a picked-up image data picked up by the image pickup unit. The display control unit 272 converts the coordinate information on the picked-up image data into coordinate information representing a position on the frame memory 255, where image data is loaded, based on calibration data showing the result of calibration carried out in advance. The calibration data associates coordinates on the picked-up image data with coordinates on the frame memory 255.

When the operation mode is the drawing mode, the display control unit 272 converts coordinate information inputted from the pointer detection unit 233 into coordinate information on the frame memory 255. The display control unit 272 controls the image processing unit 250 to superimpose the drawing data at the coordinates on the frame memory 255 indicated by the coordinate information resulting from the conversion.

Meanwhile, when the operation mode is the PC mode, the display control unit 272 transmits the coordinate information inputted from the pointer detection unit 233 or the coordinate information converted into coordinates on the frame memory 255 to an external device such as the image supply device 300.

For example, if the switching device 100, the projector 200, and the image supply device 300 are connected via an HDMI cable, the coordinate information may be transmitted to the image supply device 300 via the input IF unit 210. If the projector 200 has a wireless communication unit, the coordinate information may be transmitted to the image supply device 300 or a personal computer via the wireless communication unit.

The switching control unit 273 generates and updates the source management table 265. The source management table 265 is a table for managing input sources and equivalent to the "table where information of a connection interface is registered" according to the invention. In this embodiment, the input source refers to the image supply device 300 supplying image data as a source to the projector 200, or the connection interface with the switching device 100 connected to the image supply device 300. The generated source management table 265 is stored in the storage unit 260. When the switching device 100 is connected to one of the first to fourth input IF units 211 to 214, the switching control unit 273 updates the registered information in the source management table 265.

FIG. 4 shows the configuration of the source management table 265 before the switching device 100 is connected.

In the source management table 265, information of the first to fourth input IF units 211 to 214 provided in the input IF unit 210 is registered. Specifically, identification information which identifies the first to fourth input IF units 211 to 214, the port numbers of the connection ports, the interface standards of the connection ports provided in the first to fourth input IF units 211 to 214, and image adjust values are registered as one record in the source management table 265. The identification information, the port numbers of the connection port, the interface standards of the connection ports, and the image adjustment values registered in the source management table 265 are described as the general term "input source information".

In this embodiment, "D-sub" is registered as the interface standard of the connection port of the first input IF unit 211. "HDMI" is registered as the interface standard of the connection port of the second input IF unit 212 and the third input IF unit 213. "Ethernet" is registered as the interface standard of the connection port of the fourth input IF unit 214.

The image adjustment values include image adjustment items for the image data inputted via the first to fourth input IF units 211 to 214, and adjustment values set for the respective adjustment items. The image adjustment items include, for example, brightness, refresh rate, color, tone of color, depth of color, contrast and the like. The image adjustment items can be set differently from one interface standard to another of the connection ports. That is, different adjustment items can be set for connection ports of different interface standards. The image adjustment value is equivalent to the "set value" according to the invention.

The switching control unit 273 updates the registered information in the source management table 265 when the switching device 100 is connected to one of the first to fourth input IF units 211 to 214. Specifically, when the connection of the switching device 100 is detected, the switching control unit 273 registers port information of the source-side IF unit 110 of the switching device 100 as input source information in the source management table 265, in addition to the input source information of the input IF unit 210.

FIG. 5 shows the source management table 265 after the switching device 100 is connected.

First, the switching control unit 273 detects the connection of an apparatus to the input IF unit 210. For example, the switching control unit 273 determines that an apparatus is connected to the input IF unit 210, based on that the apparatus is connected to one of the first to fourth input IF units 211 to 214 and 5-V power starts being supplied to the connected apparatus is started. If the first to fourth input IF units 211 to 214 are interfaces having a hot plug detection function, the switching control unit 273 can detect the connection of an apparatus, based on hot plug detection. The switching control unit 273 may also detect the connection of an apparatus, based on control information received from the apparatus connected to the input IF unit 210. For example, if the second input IF unit 212 is an HDMI interface, the switching control unit 273 can determine that an apparatus is connected to the second input IF unit 212, when a CEC command is received.

When an apparatus is connected to the input IF unit 210, the switching control unit 273 transmits an acquisition request to acquire information about the apparatus, to the apparatus whose connection is detected. If the switching device 100 and the projector 200 are connected, for example, via an HDMI interface, the switching control unit 273 transmits an acquisition request to acquire information about the apparatus via a CEC line. On receiving the acquisition request from the projector 200, the switching device 100 transmits information that the apparatus is a switching device (hereinafter referred to as type information) to the projector 200 via a CEC line.

The switching device 100 also transmits the port information to the projector 200 every predetermined time. As described above, the port information includes the information of the number of connection ports provided in the source-side IF unit 110, the information representing the signal input state to each connection port, the information representing the port number of each connection port, and the information representing the interface standard of each connection port, or the like. The port information is equivalent to the "information of the first interface" and the "information of the second interface" of the invention.

The switching control unit 273 determines whether the apparatus connected to the input IF unit 210 is the switching device 100 or not, based on the received type information. If the switching control unit 273 determines that the connected apparatus is the switching device 100, the switching control unit 273 rewrites the input source information registered in the source management table 265 and thus updates the source management table 265. If the switching control unit 273 determines that the apparatus connected to the input IF unit 210 is not the switching device 100, the switching control unit 273 does not update the source management table 265. That is, if the image supply device 300 such as a personal computer is connected to the input IF unit 210, the switching control unit 273 does not update the source management table 265.

Here, operations of the switching control unit 273 when the switching device 100 is connected to the third input IF unit 213 of the input IF unit 210 are described as an example.

When the switching device 100 is connected to the third input IF unit 213, the switching control unit 273 first deletes the input source information of the third input IF unit 213 registered in the source management table 265. Since the switching device 100 is connected to the third input IF unit 213, the switching control unit 273 deletes the input source information of the third input IF unit 213 from the source management table 265.

Next, the switching control unit 273 registers the port information of the source-side IF unit 110 received from the switching device 100, as input source information in the source management table 265. More specifically, the switching control unit 273 registers the port information of the source-side IF unit 110 in place of the deleted record of the third input IF unit 213. In a shaded area 267 in FIG. 5, the port information of the first source-side IF unit 111, the second source-side IF unit 112, and the third source-side IF unit 113 is registered as input source information.

When registering the port information of the source-side IF unit 110 in the source management table 265, the switching control unit 273 determines whether input source information of the same interface standard is registered or not.

The switching control unit 273 first determines the interface standard of the connection port in each of the first source-side IF unit 111, the second source-side IF unit 112, and the third source-side IF unit 113, based on the received port information. In this embodiment, the interface standards of the first source-side IF unit 111, the second source-side IF unit 112, and the third source-side IF unit 113 are "HDMI".

Next, the switching control unit 273 determines whether input source information of the same interface standard as the interface standards of the first to third source-side IF units 111 to 113 is registered in the source management table 265 or not. In this embodiment, the interface standards of the second input IF unit 212 and the third input IF unit 213 are "HDMI", which is the same as the interface standards of the first to third source-side IF units 111 to 113.

If input source information of the same interface standard is registered in the source management table 265, the switching control unit 273 determines whether the image adjustment values of the registered input source information are adjustment values set by the user or not.

If the image adjustment values of the registered input source information are adjustment values set by the user, the switching control unit 273 registers the image adjustment values of the registered input source information, as the image adjustment values of the first to third source-side IF units 111 to 113. Therefore, when registering the input source information of the first to third source-side IF units 111 to 113, the time and effort of resetting the image adjustment values can be saved. Meanwhile, if the image adjustment values of the registered input source information are default adjustment values, the switching control unit 273 registers the default adjustment values as the image adjustment values of the first to third source-side IF units 111 to 113.

Based on the registration of the port information of the source-side IF unit 110 of the switching device 100 in the source management table 265, the projector 200 treats the source-side IF unit 110 of the switching device 100 as a part of the input IF unit 210. That is, the projector 200 treats the source-side IF unit 110 of the switching device 100 as a connection interface with an external device provided in the projector 200.

For example, the display control unit 272 causes a source selection screen 290 to be displayed on the screen SC, if a source switching button on the remote controller 5 is operated or if a source switching icon is selected by the pointer 50. The source switching icon is an image of an icon or the like indicating a switching of the source displayed on the screen SC. The remote controller 5, the remote controller light receiving unit 230, the pointer 50, and the pointer detection unit 233 are equivalent to the "operation unit" according to the invention.

The source selection screen 290 is a screen showing the source information registered in the source management table 265 and is equivalent to the "display screen" according to the invention. When the switching device 100 is connected to the projector 200, the input source information of the source-side IF unit 110 of the switching device 100 is shown as a selectable input source on the source selection screen 290.

Figure 6:
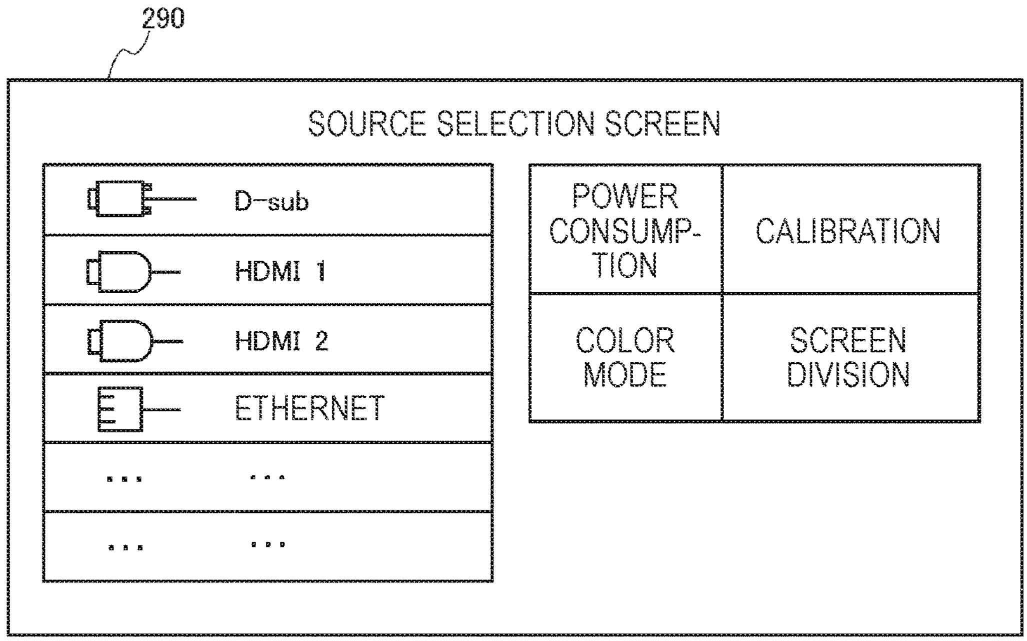
FIG. 6 shows a source selection screen before the switching device is connected.
Figure 7:
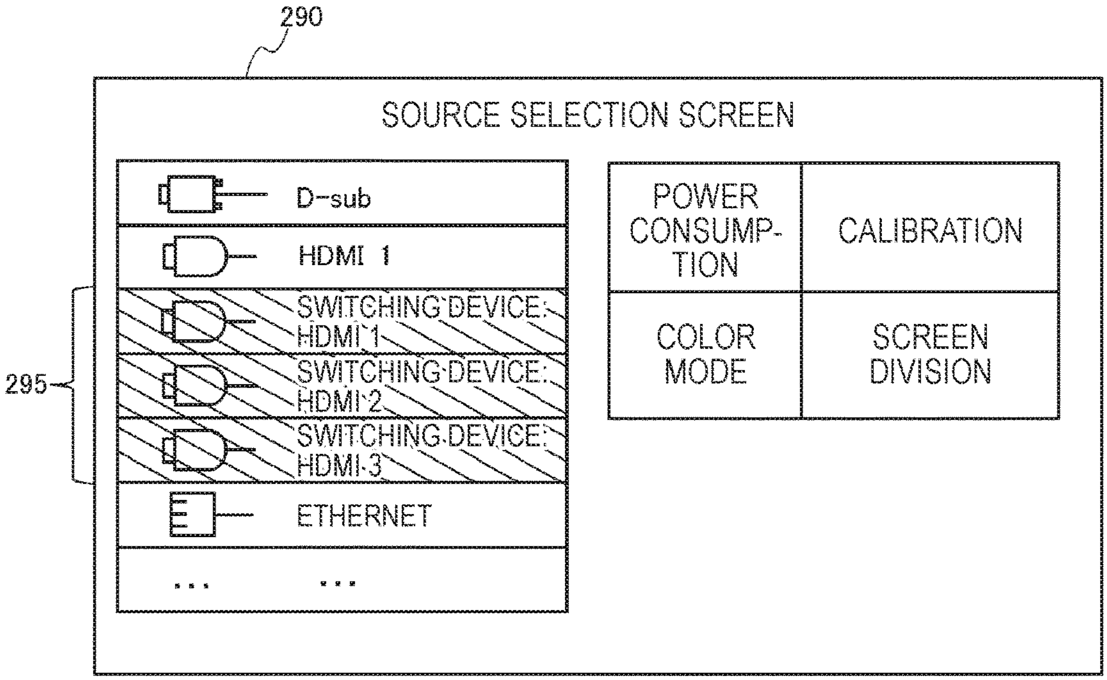
FIG. 7 shows the source selection screen after the switching device is connected.

FIG. 6 shows the source selection screen 290 before the switching device 100 is connected. FIG. 7 shows the source selection screen 290 after the switching device 100 is connected.

If the source switching button on the remote controller 5 is selected or the source switching icon is selected by the pointer 50 before the switching device 100 is connected, the display control unit 272 causes the projection unit 220 to display the source selection screen 290 shown in FIG. 6 on the screen SC. The source selection screen 290 shown in FIG. 6 shows the input source information of the first to fourth input IF units 211 to 214 provided in the input IF unit 210.

Meanwhile, if the source switching button on the remote controller 5 is selected or the source switching icon is selected by the pointer 50 after the switching device 100 is connected to the input IF unit 210, the display control unit 272 causes the projection unit 220 to display the source selection screen 290 shown in FIG. 7 on the screen SC. The source selection screen 290 shows the input source information of the source-side IF unit 110 as well as the input source information of the first, second, and fourth input IF units 211, 212, 214 provided in the input IF unit 210. In a shaded area 295 shown in FIG. 7, the input source information of the source-side IF unit 110 is displayed. The input source information of the third input IF unit 213 is not displayed. This is because the third input IF unit 213 is already connected to the switching device 100.

For example, it is now assumed that one of the first to third source-side IF units 111 to 113 of the source-side IF unit 110 is selected as an input source before the source switching button or the source switching icon is selected. The projector 200 is supplied with image data from the image supply device 300 connected to the selected one of the first to third source-side IF units 111 to 113.

When one of the first to third source-side IF units 111 to 113 displayed on the source selection screen 290 is selected as an input source, the switching control unit 273 transmits a switch request (change request) to the switching device 100. This switch request includes identification information which identifies the selected input source such as port number.

The switching device 100 has a first operation mode and a second operation mode, as its operation modes. In the first operation mode, one of the first to third source-side IF units 111 to 113 is selected and the selected one of the first to third source-side IF units 111 to 113 is connected to the PJ-side IF unit 120. Also, in the first operation mode, the image supply device 300 is connected to the selected one of the first to third source-side IF units 111 to 113, and the switching device 100 outputs image data outputted from the connected image supply device 300, to the projector 200.

On receiving the switch request including the identification information from the projector 200, the switching device 100 changes the operation mode from the first operation mode to the second operation mode.

The control unit 140 controls the connection switching unit 130 to execute a connection switching between the source-side IF unit 110 and the PJ-side IF unit 120, based on the identification information included in the switch request.

The control unit 140 disconnects the one of the first to third source-side IF units 111 to 113 connected to the PJ-side IF unit 120 from the PJ-side IF unit 120 and connects the selected one of the first to third source-side IF units 111 to 113 to the PJ-side IF unit 120. Subsequently, the switching device 100 outputs image data supplied from the image supply device 300 connected to the selected one of the first to third source-side IF units 111 to 113, to the projector 200.

Figure 8:
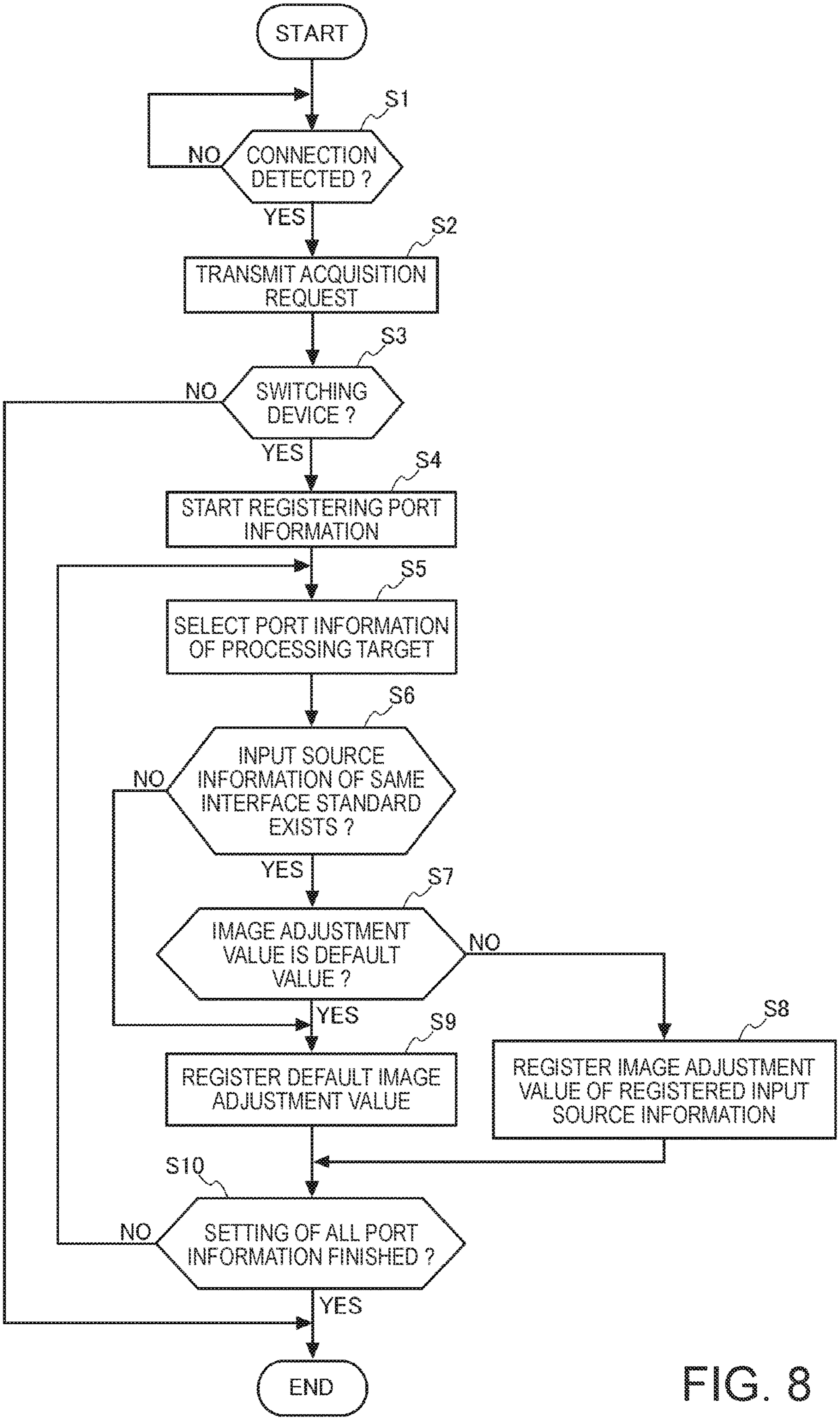
FIG. 8 is a flowchart showing operations of the projector.

FIG. 8 is a flowchart showing operations of the projector 200. Particularly, FIG. 8 is a flowchart showing operations when the switching device 100 is connected to the input IF unit 210.

The control unit 270 first determines whether an apparatus is connected to the input IF unit 210 or not (step S1). If the connection of an apparatus is not detected (NO in step S1), the control unit 270 waits until the connection of an apparatus is detected, and carries out other executable processing.

If the connection of an apparatus is detected (YES in step S1), the control unit 270 communicates with the apparatus whose connection is detected, and transmits an acquisition request to acquire information about the apparatus, to the detected apparatus (step S2). On receiving type information from the apparatus to which the acquisition request is transmitted, the control unit 270 determines whether the connected apparatus is the switching device 100 or not, based on the received type information (step S3). If the control unit 270 determines that the connected apparatus is not the switching device 100 (NO in step S3), the control unit 270 ends this processing flow.

Meanwhile, if the control unit 270 determines that the connected apparatus is the switching device 100 (YES in step S3), the control unit 270 starts processing to register the port information of the source-side IF unit 110 received from the switching device 100, in the source management table 265 (step S4).

The control unit 270 first selects port information of a processing target (step S5). Next, referring to the interface standard of the port information of the processing target, the control unit 270 determines whether input source information including a connection port of the same interface standard is registered in the source management table 265 or not (step S6).

If input source information of the same interface standard is not registered (NO in step S6), the control unit 270 registers the port information of the processing target in a record section for registration in the source management table 265. In this case, when registering an image adjustment value in the source management table 265, the control unit 270 registers a default image adjustment value prepared for the interface standard of the connection port (step S9).

Meanwhile, if input source information of the same interface standard is registered (YES in step S6), the control unit 270 determines whether the image adjustment value of the registered input source information is a default value or not (step S7). If the image adjustment value of the registered input source information is a default value (YES in step S7), the control unit 270 registers the port information of the processing target in a record section for registration in the source management table 265. In this case, when registering the image adjustment value in the source management table 265, the control unit 270 registers a default image adjustment value prepared for the interface standard of the connection port (step S9).

If the image adjustment value of the registered input source information is not a default value (NO in step S7), the control unit 270 registers the port information of the processing target in a record section for registration in the source management table 265. In this case, when registering the image adjustment value in the source management table 265, the control unit 270 registers the image adjustment value of the registered input source information (step S8).

Next, the control unit 270 determines whether all the port information received from the switching device 100 is registered in the source management table 265 or not (step S10). If not all the port information is registered in the source management table 265 (NO in step S10), the control unit 270 shifts to the processing of step S5 and selects port information of the processing target. Meanwhile, if all the port information is registered in the source management table 265 (YES in step S10), the control unit 270 ends this processing flow.

Figure 9:
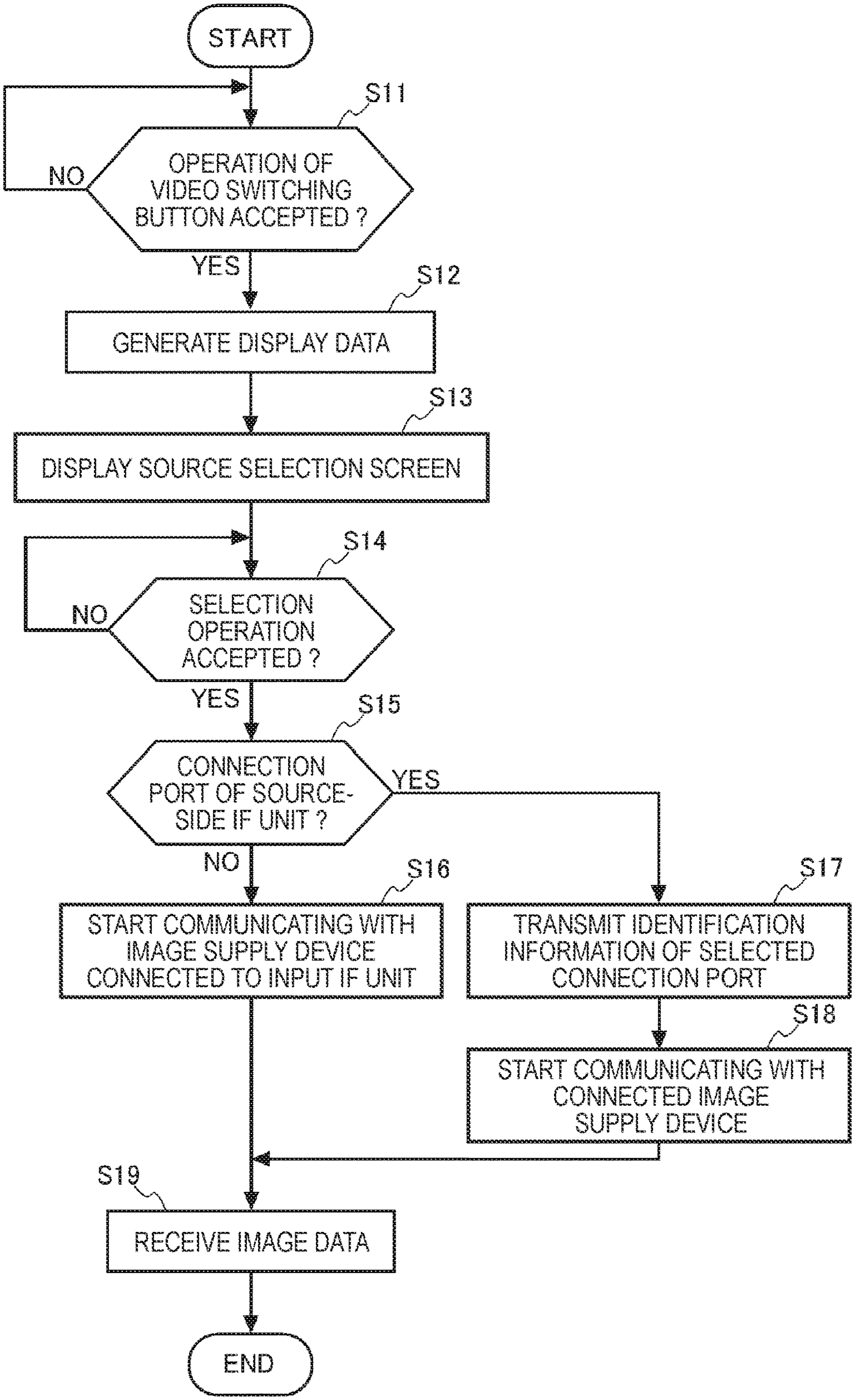
FIG. 9 is a flowchart showing operations of the projector.

FIG. 9 is a flowchart showing operations of the projector 200. Particularly, FIG. 9 is a flowchart showing operations of the projector 200 when the source switching button on the remote controller 5 is selected or when the source switching icon is selected by the pointer 50.

The control unit 270 determines whether an instruction to switch sources is accepted or not (step S11). If an instruction to switch sources is not accepted (NO in step S11), the control unit 270 waits until an instruction to switch sources is accepted.

Meanwhile, if an instruction to switch sources is accepted (YES in step S11), the control unit 270 generates display data for displaying the source selection screen 290, referring to the source management table 265 stored in the storage unit 260 (step S12). The control unit 270 causes the projection unit 220 to display the generated display data and thus display the source selection screen 290 on the screen SC (step S13).

Next, the control unit 270 determines whether a selection operation to select a connection port is accepted or not (step S14). If a selection operation is not accepted (NO in step S14), the control unit 270 waits until a selection operation is accepted. Meanwhile, if a selection operation is accepted (YES in step S14), the control unit 270 determines whether a connection port of the source-side IF unit 110 is selected as an input source or not (step S15). If a connection port of the source-side IF unit 110 is not selected (NO in step S15), the control unit 270 determines that a connection port of the input IF unit 210 is selected as an input source. In this case, the control unit 270 starts communicating with the image supply device 300 connected to the selected one of the first input IF unit 211, the second input IF unit 212, and the fourth input IF unit 214 (step S16), and inputs image data supplied from the image supply device 300 (step S19).

Meanwhile, if a connection port of the source-side IF unit 110 is selected as an input source (YES in step S15), the control unit 270 transmits a switch request including the identification information of the selected connection port of the source-side IF unit 110 to the switching device 100 (step S17). The switching device 100 connects the connection port indicated by the identification information included in the received switch request, to the PJ-side IF unit 120. This enables the projector 200 to communicate with the image supply device 300 connected to the connected port indicated by the identification information. The projector 200 starts communicating with the image supply device 300 connected to the selected connection port (step S18), and inputs image data supplied from the image supply device 300 (step S19).

Figure 10:
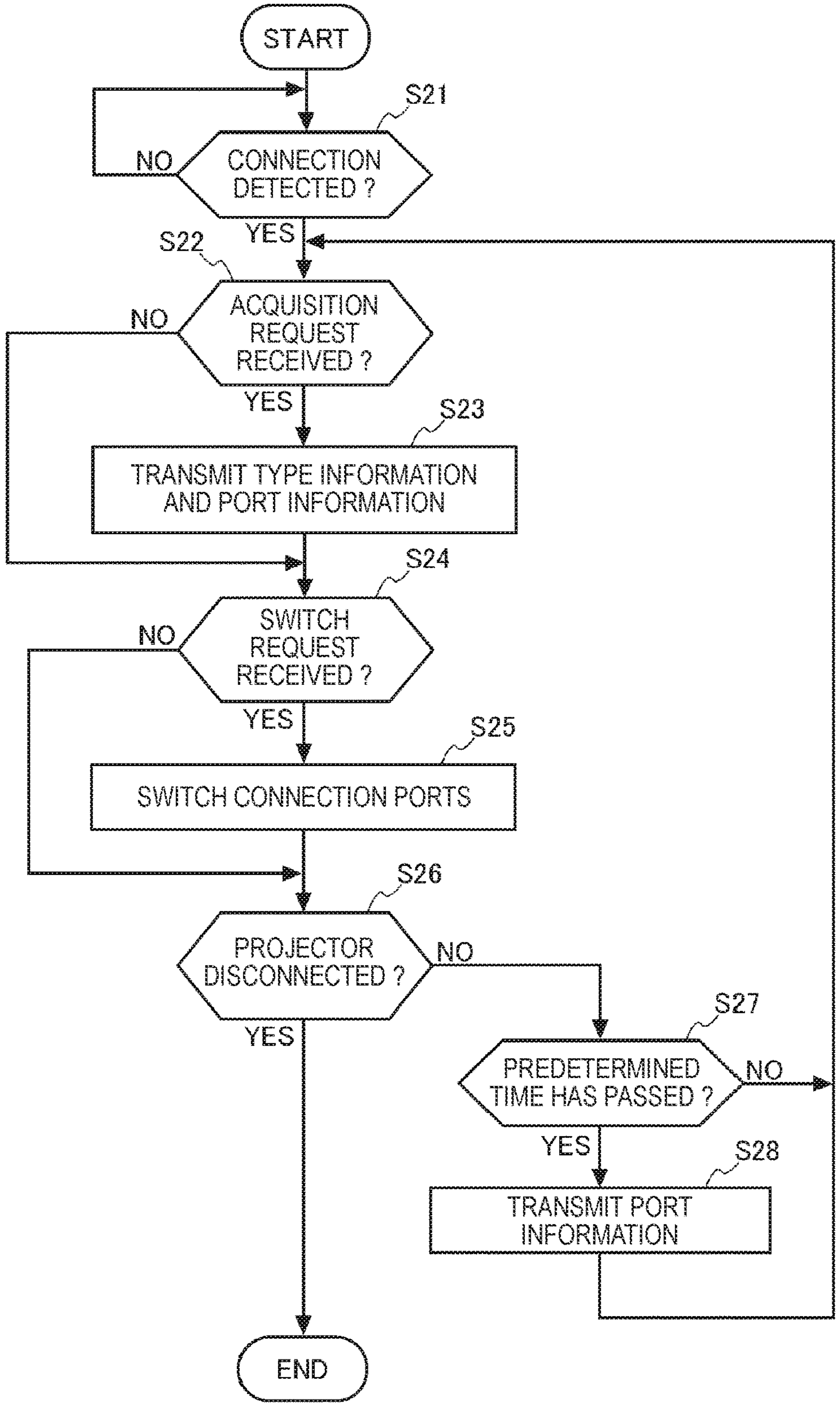
FIG. 10 is a flowchart showing operations of the switching device.

FIG. 10 is a flowchart showing operations of the switching device 100. Particularly, FIG. 10 is a flowchart showing operations of the control unit 140 when the switching device 100 is connected to the input IF unit 210 of the projector 200.

The control unit 140 determines whether an apparatus is connected to the PJ-side IF unit 120 or not (step S21). Since the apparatus connected to the PJ-side IF unit 120 is the projector 200, the apparatus is hereinafter referred to as the projector 200. If the projector 200 is not connected to the PJ-side IF unit 120, the control unit 140 waits until connection is detected. Meanwhile, if the projector 200 is connected to the PJ-side IF unit 120 (YES in step S21), the control unit 140 determines whether an acquisition request to acquire information about the apparatus is received from the connected projector 200 or not (step S22). If an acquisition request is not received (NO in step S22), the control unit 140 shifts to the processing of step S24. Meanwhile, if an acquisition request is received (YES in step S22), the control unit 140 transmits type information representing the type of the switching device 100 and port information to the projector 200 (step S23).

Next, the control unit 140 determines whether a switch request to switch connection is received from the projector 200 or not (step S24). If a switch request is not received (NO in step S24), the control unit 140 shifts to the determination of step S26. Meanwhile, if a switch request is received (YES in step S24), the control unit 140 switches connection ports (step S25). That is, the control unit 140 controls the connection switching unit 130 to connect a connection port indicated by identification information included in the received switch request, to the PJ-side IF unit 120.

Next, the control unit 140 determines whether the projector 200 is disconnected or not (step S26). For example, if 5-V power is no longer supplied from the projector 200, the control unit 140 determines that the projector 200 is disconnected. If the control unit 140 determines that the projector 200 is disconnected (YES in step S26), the control unit 140 ends this processing flow. Meanwhile, if the control unit 140 determines that the projector 200 is not disconnected (NO in step S26), the control unit 140 determines whether or not a predetermined time has passed from the previous transmission of port information to the projector 200 (step S27). If the control unit 140 determines that a predetermined time has passed from the previous transmission of port information (YES in step S27), the control unit 140 transmits new port information to the projector 200 (step S28). Meanwhile, if the control unit 140 determines that a predetermined time has not passed from the previous transmission of port information (NO in step S27), the control unit 140 returns to the determination of step S22.

Figure 11:
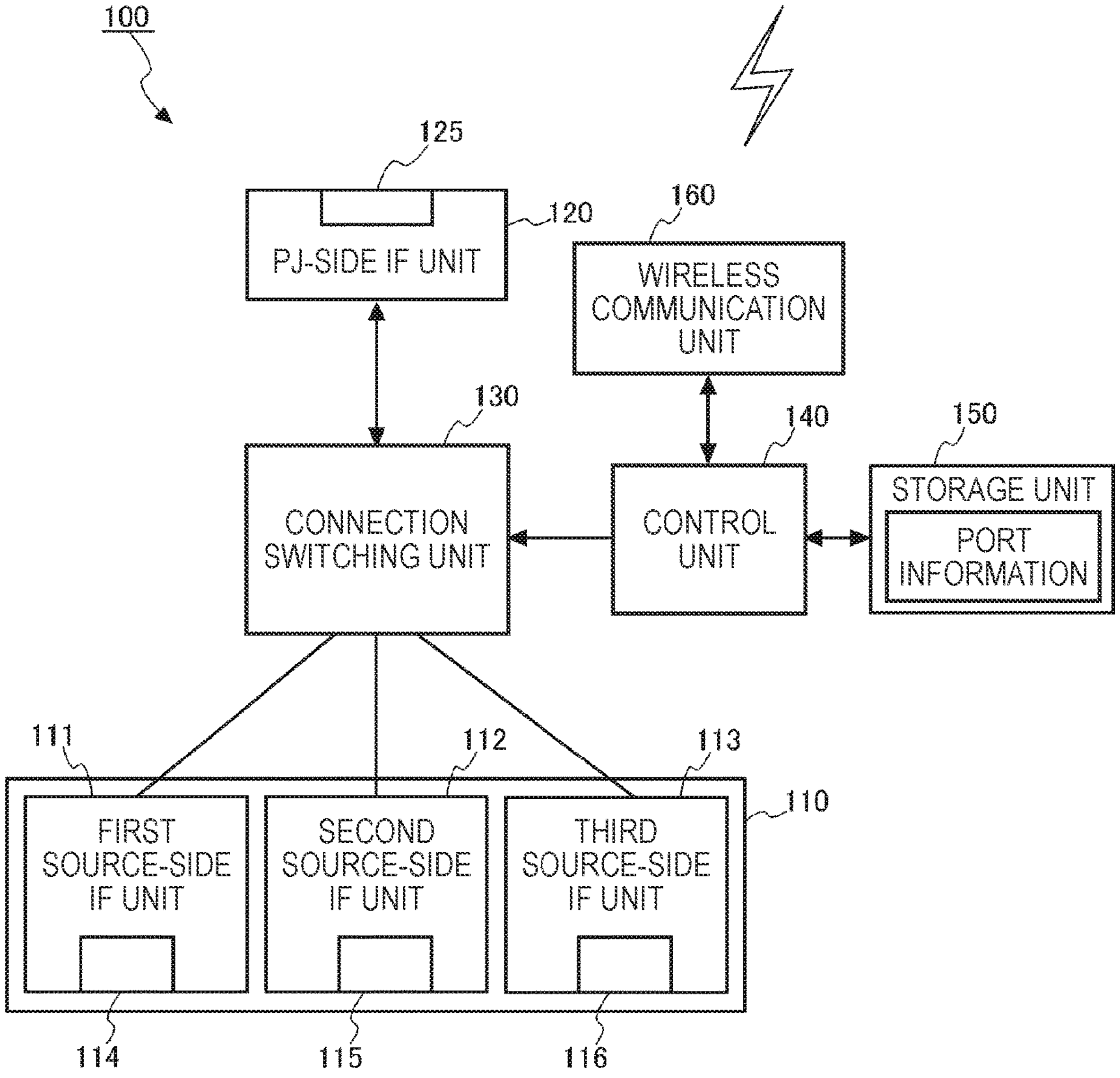
FIG. 11 shows another configuration of the switching device.

FIG. 11 shows another configuration of the switching device 100.

The switching device 100 shown in FIG. 11 has a wireless communication unit 160. The wireless communication unit 160 is equivalent to the "fourth interface" connected to the projector 200 and transmits and receives control information to and from the projector 200. The switching device 100 receives control information transmitted from the projector 200, via the wireless communication unit 160. The control unit 140 extracts a switch request from the control information received via the wireless communication unit 160 and connects one of the first to third source-side IF units 111 to 113 to the PJ-side IF unit 120 in response to the extracted switch request.

The control information need not be wireless transmitted and received between the projector 200 and the switching device 100. For example, the projector 200 and the switching device 100 may be connected via a cable for data communication such as USB or Ethernet and thus may transmit and receive the control information.

In the embodiment, all the first to third source-side IF units 111 to 113 are of the interface standard of HDMI. Therefore, the first to third source-side IF units 111 to 113 are targets to which connection is switched by the switching device 100. For example, it is now assumed that the interface standard of the first source-side IF unit 111 is D-sub and that the PJ-side IF unit 120 has a connection port compatible with D-sub in addition to an HDMI interface. In this case, the input IF unit 210 of the projector 200 and the PJ-side IF unit 120 need to be connected one-to-one by D-sub. Also, the D-sub-compatible interface of the PJ-side IF unit 120 and the D-sub-compatible interface of the first source-side IF unit 111 need to be directly connected. Therefore, if the connection port of one of the first to third source-side IF units 111 to 113 is a connection port to be connected one-to-one by D-sub or the like, this connection port is not regarded as a target to which connection is switched by the switching device 100.

As described above, in the embodiment, the switching device 100 includes the first to third source-side IF units 111 to 113 as the first interface or the second interface, the PJ-side IF unit 120 as the third interface connected to the projector 200, and the control unit 140 as the first control unit.

When the operation mode is the first operation mode, the control unit 140 causes the PJ-side IF unit 120 to transmit image data inputted to one of the first to third source-side IF units 111 to 113, to the projector 200. When the operation mode is the second operation mode, the control unit 140 causes the PJ-side IF unit 120 to transmit, to the projector 200, image data inputted to one of the first to third source-side IF units 111 to 113 that is not the one of the first to third source-side IF units 111 to 113 connected when in the first operation mode. When a change request is received from the projector 200, the control unit 140 changes the operation mode in response to the received change request.

Thus, a switching between the interfaces provided in the switching device 100 can be carried out via the projector 200.

The control unit 140 also causes the PJ-side IF unit 120 to receive a change request transmitted from the projector 200.

Thus, a change request to change the operation mode can be received by the PJ-side IF unit 120, which is used to transmit image data.

The switching device 100 also has the wireless communication unit 160 as the fourth interface connected to the projector 200. The control unit 140 changes the operation mode in response to a change request received via the wireless communication unit 160 from the projector 200.

Thus, control information can be transmitted and received via the wireless communication unit 160.

When the projector 200 is connected, the control unit 140 transmits the port information of the source-side IF unit 110 to the projector 200.

The projector 200 has the storage unit 260, the control unit 270 as the second control unit, and the remote controller 5 as the operation unit.

The storage unit 260 stores the source management table 265, where information of a connection interface with an external device provided in the projector 200 is registered.

The control unit 270 registers the port information of the source-side IF unit 110 received from the switching device 100, in the source management table 265.

When one of the first to third source-side IF units 111 to 113 provided in the source-side IF unit 110 is selected, the control unit 270 transmits, to the switching device 100, a change request to change to the selected one of the first to third source-side IF units 111 to 113.

Thus, a switching in the source-side IF unit 110 can be carried out via the projector 200.

The control unit 270 also deletes the input source information of the one of the first to fourth input IF units 211 to 214 to which the switching device 100 is connected, from the source management table 265. The control unit 270 then registers the input source information of the first to third source-side IF units 111 to 113 in the source management table 265.

Thus, the input source information of the first to third source-side IF units 111 to 113 can be registered in place of the input source information of the one of the first to fourth input IF units 211 to 214 to which the switching device 100 is connected.

The control unit 270 also registers image adjustment values set for image data inputted via the connection interface, as input source information in the source management table 265.

If input source information of the same interface standard as one of the first to third source-side IF units 111 to 113 is registered, the image adjustment values of the input source information of the same interface standard are registered as the input source information of the first to third source-side IF units 111 to 113.

The time and effort of resetting the image adjustment values can be saved when registering the input source information of the first to third source-side IF units 111 to 113 in the source management table 265.

The projector 200 also has the projection unit 220.

The control unit 270 causes the projection unit 220 to project the source selection screen 290 showing the input source information of the input IF unit 210 of the projector 200 and the input source information of the source-side IF unit 110.

If an interface unit of the source-side IF unit 110 is selected by the remote controller 5, the control unit 270 transmits a change request which request a change to the selected interface unit, to the switching device 100.

Thus, an interface to which image data is inputted can be selected with reference to the source selection screen 290 displayed by the projector 200. If the source-side IF unit 110 of the switching device 100 is selected as an interface to which image data is inputted, a switching in the source-side IF unit 110 of the switching device 100 can be carried out via the projector 200.

The above embodiment represents a preferred form of embodiment and should not limit the invention. Various modifications can be made without departing from the spirit and scope of the invention.

For example, the connection switching unit 130 may be provided with a format conversion unit. It is now assumed that the interface standard of the connection port of the first source-side IF unit 111 is DVI or DisplayPort and that the interface standard of the PJ-side IF unit 120 is HDMI. In this case, the connection switching unit 130 converts a signal inputted via the DisplayPort or DVI interface into a signal conforming to the HDMI standard and outputs the resulting signal to the projector 200.

The projector 200 may be a liquid crystal projector using a transmission-type liquid crystal panel, or a projector using a reflection-type liquid crystal panel or digital mirror device. The display device according to the invention is not limited to a projector projecting an image on the screen SC and includes various display devices such as a liquid crystal monitor or liquid crystal television which displays an image on a liquid crystal panel, a monitor device or television receiver which displays an image on a PDP (plasma display panel), or a self-emission display device like a monitor device or television receiver which displays an image on an organic EL display panel called OLED (organic light-emitting diode) or OEL (organic electro-luminescence).

The functional units of the switching device 100 shown in FIG. 2 and the function units of the projector 200 shown in FIG. 3 represent functional configurations implemented by the collaboration of hardware and software and are not particularly limited to any specific form of embodiment. Therefore, pieces of hardware individually corresponding to the function units need not necessarily be installed. A single processor may execute a program to implement functions of a plurality of functional units. In the embodiment, a part of the functions implemented by software may be implemented by hardware, and a part of the functions implemented by hardware may be implemented by software.

What is claimed is:

1. An electronic apparatus comprising:

a first interface;

a second interface which is different from the first interface;

a third interface connected to a display device;

a fourth interface which is connected to the display device and is different from the third interface; and a first control unit which causes the third interface to transmit image data inputted to the first interface to the display device when an operation mode of the electronic apparatus is a first operation mode, and causes the third interface to transmit image data inputted to the second interface to the display device when the operation mode of the electronic apparatus is a second operation mode, wherein the first control unit switches the operation mode to one of the first operation mode and the second operation mode in response to a change request received from the display device, and switches the operation mode to one of the first operation mode and the second operation mode in response to a change request received by the fourth interface.

2. The electronic apparatus according to claim 1, wherein the first control unit causes the third interface to receive the change request transmitted from the display device.

3. A display system including a display device and an electronic apparatus connected to the display device, the electronic apparatus comprising:

a first interface;

a second interface which is different from the first interface;

a third interface connected to the display device; and a first control unit which causes the third interface to transmit image data inputted to the first interface to the display device when an operation mode of the electronic apparatus is a first operation mode, and causes the third interface to transmit image data inputted to the second interface to the display device when the operation mode of the electronic apparatus is a second operation mode, wherein the first control unit switches the operation mode to one of the first operation mode and the second operation mode in response to a change request received from the display device, the first control unit transmits information of the first interface and information of the second interface to the display device when the display device is connected to the electronic apparatus, the display device comprises:

a storage unit which stores a table where information of a connection interface with an external device provided in the display device is registered;

a second control unit which registers, in the table, the information of the first interface and the information of the second interface received from the electronic apparatus; and an operation unit which accepts an operation, and when an operation accepted by the operation unit selects the first interface or the second interface as the connection interface with the external device, the second control unit transmits a change request to change to the first interface or the second interface thus selected, to the electronic apparatus.

4. The display system according to claim 3, wherein the second control unit deletes, from the table, information of the connection interface of the display device to which the electronic device is connected, and registers the information of the first interface and the information of the second interface in the table.

5. The display system according to claim 4, wherein the second control unit registers, in the table, a set value that is set for image data inputted via the connection interface, as the information of the connection interface, and when the second control unit registers the information of the first interface or the second interface in the table, when information of a connection interface of the same standard as the first interface or the second interface is already registered in the table, the second control unit registers the set value that is set for the connection interface of the same standard, as the set value for the image data inputted via the first interface or the second interface.

6. The display system according to claim 3, wherein the display device includes a display unit, the second control unit causes the display unit to display a display screen showing the information of the connection interface provided in the display device and the information of the first interface and the second interface, and when the operation unit accepts an operation of selecting the first interface or the second interface, the second control unit transmits a change request to request a change to the first interface or the second interface thus selected, to the electronic apparatus.

7. A method for controlling an electronic apparatus having a first interface, a second interface which is different from the first interface, a third interface connected to a display device, and a fourth interface which is connected to the display device and is different from die third interface, the method comprising:

switching an operation mode of the electronic apparatus to one of a first operation mode and a second operation mode in response to a change request received from the display device;

causing the third interface to transmit image data inputted to the first interface to the display device when the operation mode of the electronic apparatus is the first operation mode;

causing the third interface to transmit image data inputted to the second interface to the display device when the operation mode of the electronic apparatus is the second operation mode, and switching the operation mode of the electronic apparatus to one of the first operation mode and the second operation mode in response to a change request received from the fourth interface.

8. A method for controlling a display system including a display device and an electronic apparatus connected to the display device, the electronic apparatus having a first interface, a second interface which is different from the first interface, and a third interface connected to a display device, the display device having a storage unit which stores a table where information of a connection interface with an external device provided in the display device is registered, an operation unit which accepts an operation, and a display unit, the method comprising:

causing the third interface to transmit image data inputted to the first interface to the display device when an operation mode of the electronic apparatus is a first operation mode;

causing the third interface to transmit image data inputted to the second interface to the display device when the operation mode of the electronic apparatus is a second operation mode;

switching the operation mode to one of the first operation mode and the second operation mode in response to a change request received from the display device;

transmitting information of the first interface and information of the second interface from the electronic apparatus to the display device when the display device is connected to the electronic apparatus;

registering, in the table, the information of the first interface and the information of the second interface received from the electronic apparatus;

causing the display unit to display a display screen showing the information of the connection interface provided in the display device and the information of the first interface and the second interface; and when an operation accepted by the operation unit selects the first interface or the second interface as the connection interface with the external device, transmitting a change request to change to the first interface or the second interface thus selected, from the display device to the electronic apparatus.

* * * * *